United States Patent
Jesse et al.

(10) Patent No.: US 12,210,325 B2
(45) Date of Patent: Jan. 28, 2025

(54) METHODS AND SYSTEMS THAT PROVIDE CLOUD-BASED PHYSICAL INFRASTRUCTURE

(71) Applicant: Mobile Tech, Inc., Hillsboro, OR (US)

(72) Inventors: Mary Jesse, Hillsboro, OR (US); Robert W. Bergstrom, Bainbridge Island, WA (US)

(73) Assignee: Mobile Tech, Inc., Hillsboro, OR (US)

( * ) Notice: Subject to any disclaimer, the term of this patent is extended or adjusted under 35 U.S.C. 154(b) by 687 days.

(21) Appl. No.: 17/467,017

(22) Filed: Sep. 3, 2021

(65) Prior Publication Data

US 2022/0075331 A1    Mar. 10, 2022

Related U.S. Application Data

(60) Provisional application No. 63/074,966, filed on Sep. 4, 2020.

(51) Int. Cl.
*G05B 13/04*    (2006.01)
*G05B 13/02*    (2006.01)

(52) U.S. Cl.
CPC ......... *G05B 13/04* (2013.01); *G05B 13/0265* (2013.01)

(58) Field of Classification Search
CPC ................ G05B 13/04; G05B 13/0265; G05B 19/41885; G05B 2219/23456

(Continued)

(56) References Cited

U.S. PATENT DOCUMENTS

| 11,650,575 B2 * | 5/2023 | Sundaram .......... G05B 19/4185 |
| | | 700/9 |
| 2009/0088875 A1 * | 4/2009 | Baier .................. G06Q 10/06 |
| | | 700/83 |

(Continued)

FOREIGN PATENT DOCUMENTS

| EP | 2541354 A2 * | 1/2013 | ......... G05B 19/0426 |
| EP | 3009902 A2 * | 4/2016 | ............ G05B 19/04 |
| EP | 3299955 A1 * | 3/2018 | ............... G06F 8/36 |

*Primary Examiner* — Ronald D Hartman, Jr.
(74) *Attorney, Agent, or Firm* — OPWII, LLC

(57) ABSTRACT

The current document is directed to methods and systems that migrate traditional control systems used to manage and administer physical infrastructure, including retail establishments, warehouses, manufacturing facilities, offices, hospitals and medical clinics, and other physical infrastructure, to cloud-computing facilities. The approach to controlling physical infrastructure disclosed in the current document is not simply an extension of traditional control systems to access and use cloud-computing facilities, but instead represents the migration of physical infrastructure into cloud-computing facilities, resulting in elimination of the need for local computers and computer-implemented control systems from the physical infrastructure and a complete abstraction and virtualization of the hardware systems within the physical infrastructure. In the currently disclosed approach, complex management logic, including policy-based and rules-based management logic as well as programmed management logic, is fully migrated from physical infrastructure to cloud-computing facilities, providing greater reliability, independence from physical infrastructure systems and components, and a centralized cloud-resident infrastructure model that can be accessed and manipulated, in cloud-computing facilities, by a wide variety of different types of applications, including management applications, visualization applications, inventory-controlled applica- (Continued)

tions, and security applications. This approach provides far greater freedom in design and implementation of both control systems as well as physical hardware systems, greatly accelerates the rates at which control systems and physical hardware systems can be improved, and also provides a conceptual-framework basis for rapid technological evolution of physical-infrastructure control systems.

14 Claims, 17 Drawing Sheets

(58) Field of Classification Search
USPC .................................................. 700/275
See application file for complete search history.

(56) References Cited

U.S. PATENT DOCUMENTS

| | | | | |
|---|---|---|---|---|
| 2013/0131840 | A1* | 5/2013 | Govindaraj | G05B 19/41845 700/19 |
| 2014/0135947 | A1* | 5/2014 | Friman | G05B 13/04 700/29 |
| 2015/0193498 | A1* | 7/2015 | Weatherhead | G06F 16/00 707/722 |
| 2016/0109875 | A1* | 4/2016 | Majewski | G06F 21/6218 700/98 |
| 2016/0274553 | A1* | 9/2016 | Strohmenger | G05B 17/02 |

* cited by examiner

METHODS AND SYSTEMS THAT PROVIDE CLOUD-BASED PHYSICAL INFRASTRUCTURE

CROSS-REFERENCE TO RELATED APPLICATION

This application claims the benefit of Provisional Application No. 63/074,966, filed Sep. 4, 2020.

TECHNICAL FIELD

The current document is directed t management of physical infrastructure, such as retail establishments, warehouses, manufacturing facilities, offices, research facilities, hospitals and medical clinics, and other such physical infrastructure and, in particular, to methods and systems that indirectly manage physical infrastructure by directly managing virtual physical infrastructure in cloud-computing facilities.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computer systems with hundreds of thousands, millions, or more components that provide enormous computational bandwidths and data-storage capacities. These large, distributed computer systems are made possible by advances in computer networking, distributed operating systems and applications, data-storage appliances, computer hardware, and software technologies.

The rapid evolution of distributed computer systems has, in turn, spawned entirely new technologies, including cloud computing. Cloud-computing facilities provide computational bandwidth and data-storage services to users and clients much as utility companies provide electrical power and water to utility consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces provide many advantages to organizations of all sizes as well as to individuals, allowing for easy and straightforward configuration of virtual computing facilities, flexibility in the types of applications and operating systems that can be configured, and other functionalities. The computational facilities provided by cloud-computing facilities are also generally geographically dispersed, with robust failover and high availability.

Another fundamental trend in modern technology is that more and more functionality is being moved to software control. Up to about 100 years ago, control systems were generally mechanical. With the development of electronics and electrical systems, control systems began to quickly migrate from purely mechanical to electromechanical control systems, and, as miniaturization of electrical circuits and systems evolved, more and more to purely electrical control systems. More recently, with the revolution in computer technology and development of microprocessors and high-capacity electronic data storage, control systems have migrated to computer-instruction-implemented control systems that run on inexpensive, but powerful and flexible microprocessors. Software controllers and control subsystems have many advantages over electrical, electromechanical, and mechanical control systems. Software controllers and control subsystems can be far more quickly designed and implemented, can be quickly updated, reprogrammed, and repurposed, and provide levels of logic complexity that cannot be practically obtained in electrical, electromechanical, and mechanical control systems.

Developments in basic control-system technology and in distributed computing provide the basis of many new and valuable technical innovations. Many different types of traditional technologies are associated with serious problems, from problems with unmanageable complexity, rigidity in design and implementation, and slowing rates of even incremental improvements. Many designers, manufacturers, and users of a wide variety of different technologies seek improvements that may have been made possible by the rapid evolution of fundamental technologies, including control-system technologies and distributed-computing technologies.

SUMMARY

The current document is directed to methods and systems that migrate traditional control systems used to manage and administer physical infrastructure, including retail establishments, warehouses, manufacturing facilities, offices, hospitals and medical clinics, and other physical infrastructure, to cloud-computing facilities. The approach to controlling physical infrastructure disclosed in the current document is not simply an extension of traditional control systems to access and use cloud-computing facilities, but instead represents the migration of physical infrastructure into cloud-computing facilities, resulting in elimination of the need for local computers and computer-implemented control systems from the physical infrastructure and a complete abstraction and virtualization of the hardware systems within the physical infrastructure. In the currently disclosed approach, complex management logic, including policy-based and rules-based management logic as well as programmed management logic, is fully migrated from physical infrastructure to cloud-computing facilities, providing greater reliability, independence from physical infrastructure systems and components, and a centralized cloud-resident infrastructure model that can be accessed and manipulated, in cloud-computing facilities, by a wide variety of different types of applications, including management applications, visualization applications, inventory-controlled applications, and security applications. This approach provides far greater freedom in design and implementation of both control systems as well as physical hardware systems, greatly accelerates the rates at which control systems and physical hardware systems can be improved, and also provides a conceptual-framework basis for rapid technological evolution of physical-infrastructure control systems.

DETAILED DESCRIPTION

The current document is directed to methods and systems that methods and systems that migrate traditional control systems used to manage and administer physical infrastructure, including retail establishments, warehouses, manufacturing facilities, offices, research facilities, hospitals and medical clinics, and other such physical infrastructure, to cloud-computing facilities.

Currently Disclosed Methods and Systems

Figure 1A:
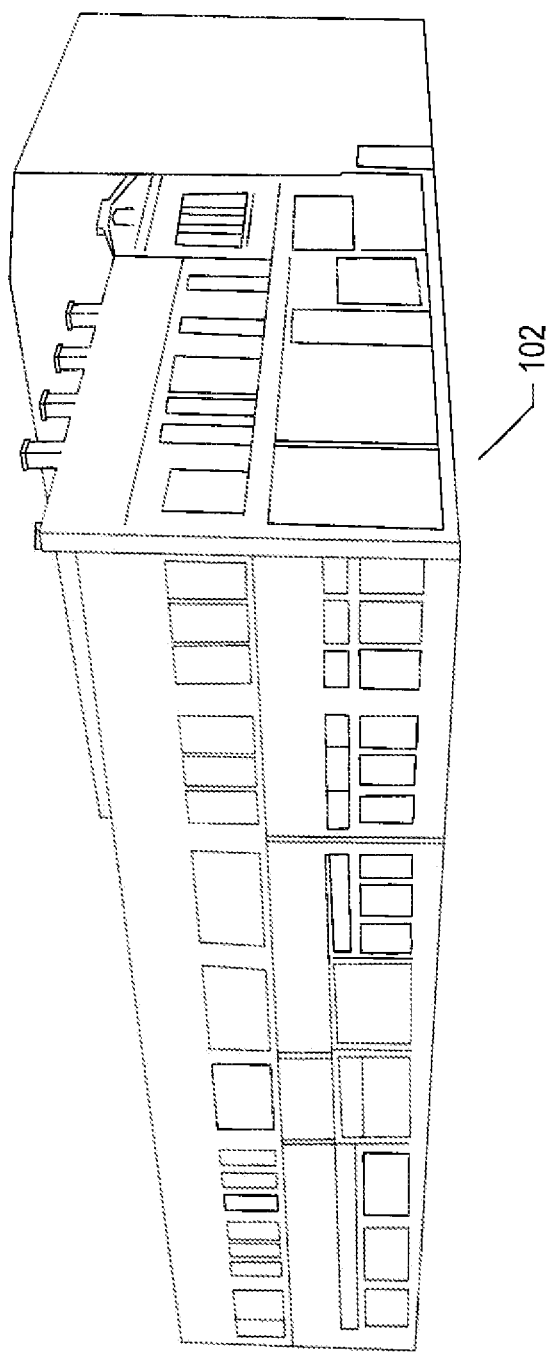
FIGS. 1A-B illustrate a retail-establishment example of physical infrastructure.
Figure 1B:
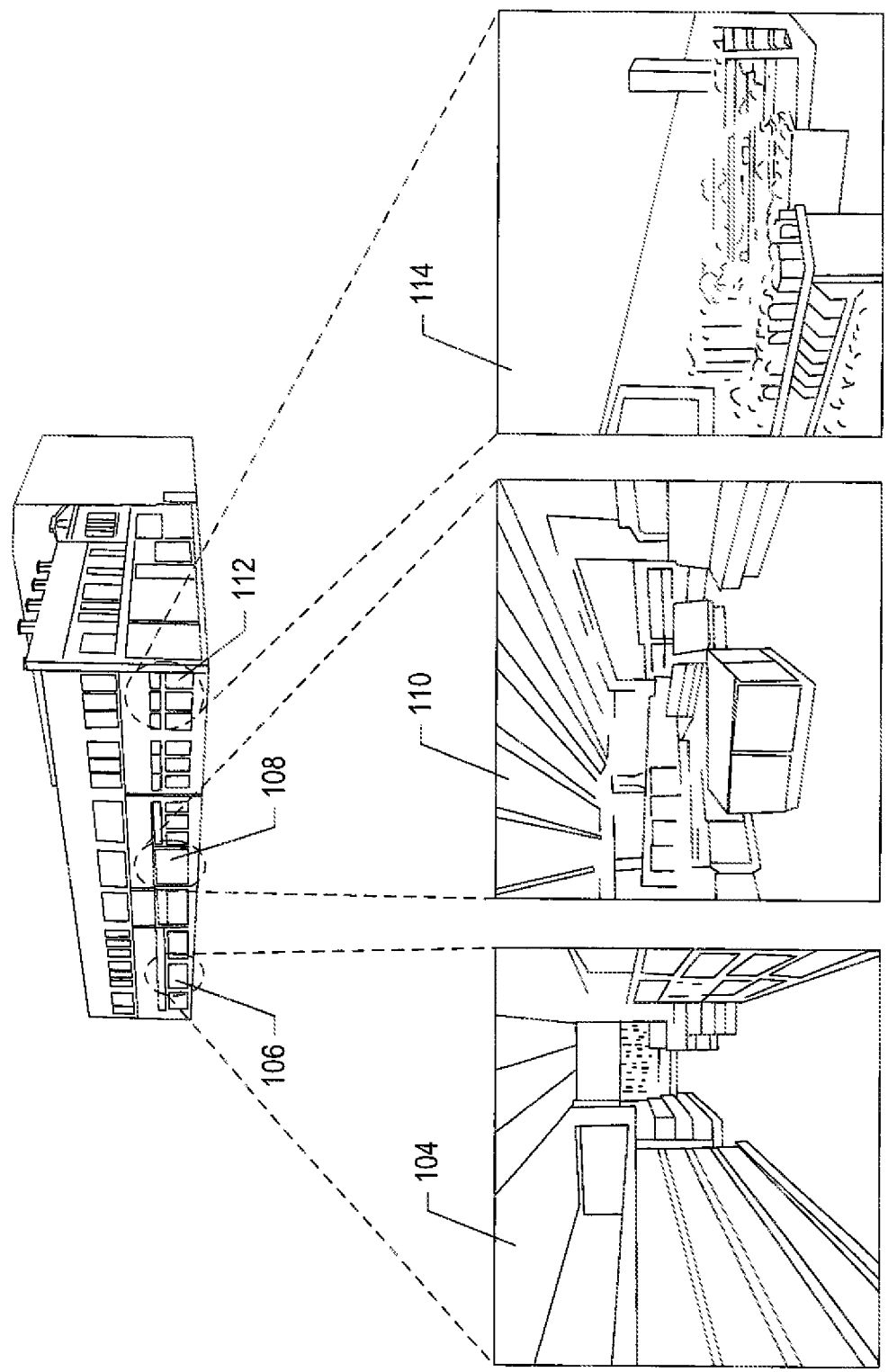

FIGS. 1A-B illustrate a retail-establishment example of physical infrastructure. This example is used throughout the following discussion, but the currently disclosed methods and systems can be similarly applied to many different types of physical infrastructure, including retail establishments, warehouses, manufacturing facilities, offices, research facilities.

FIG. 1A shows a retail establishment 102 from an external vantage point. The retail establishment resides within a physical building and consists of numerous different rooms housing various different types of display rooms and product displays. As shown in FIG. 1B, inset 104 shows an internal view one portion 106 of the retail establishment that displays grocery items for sale. Another portion of the retail establishment 108 may display various types of household and electronic items for sale, as shown in inset 110. A third portion of the retail establishment 112 may display additional types of household items for sale, including cleaning supplies and work apparel, as shown in inset 114. The retail establishment may contain many additional different types of product-display infrastructure, display many different types of products, there may contain many additional different types of infrastructure, including video-camera monitors, different types of security devices and security features, various types of inventory infrastructure, including inventory-monitoring equipment and inventory-stocking equipment, various types of retailing infrastructure, including cash registers, computer terminals, and cashier stations, and various types of administration-and-management infrastructure, including back offices with one or more computer systems, communications equipment and systems, and staff facilities. Even a seemingly small and specialized retail establishment may include many different layers of complex infrastructure.

Figure 2A:
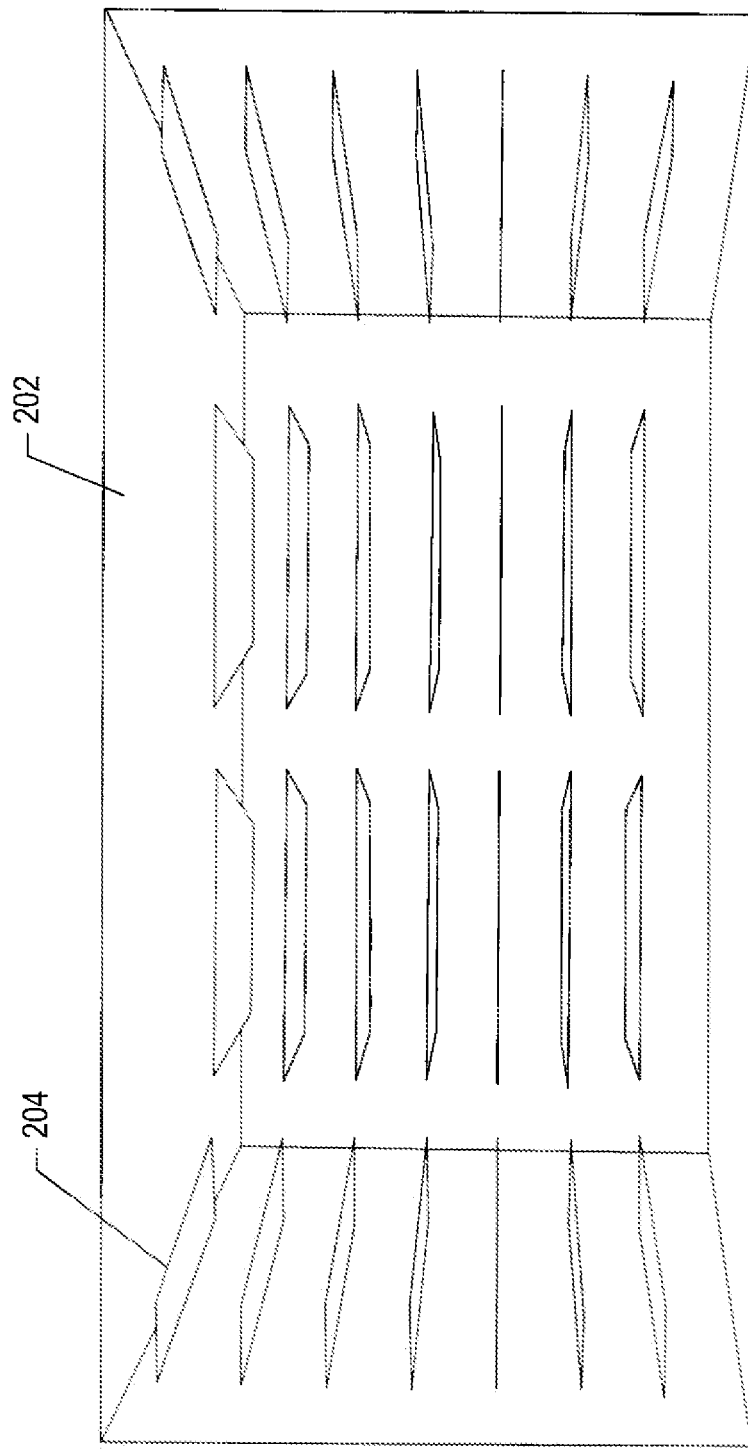
FIGS. 2A-B illustrate logical models of physical infrastructure.
Figure 2B:
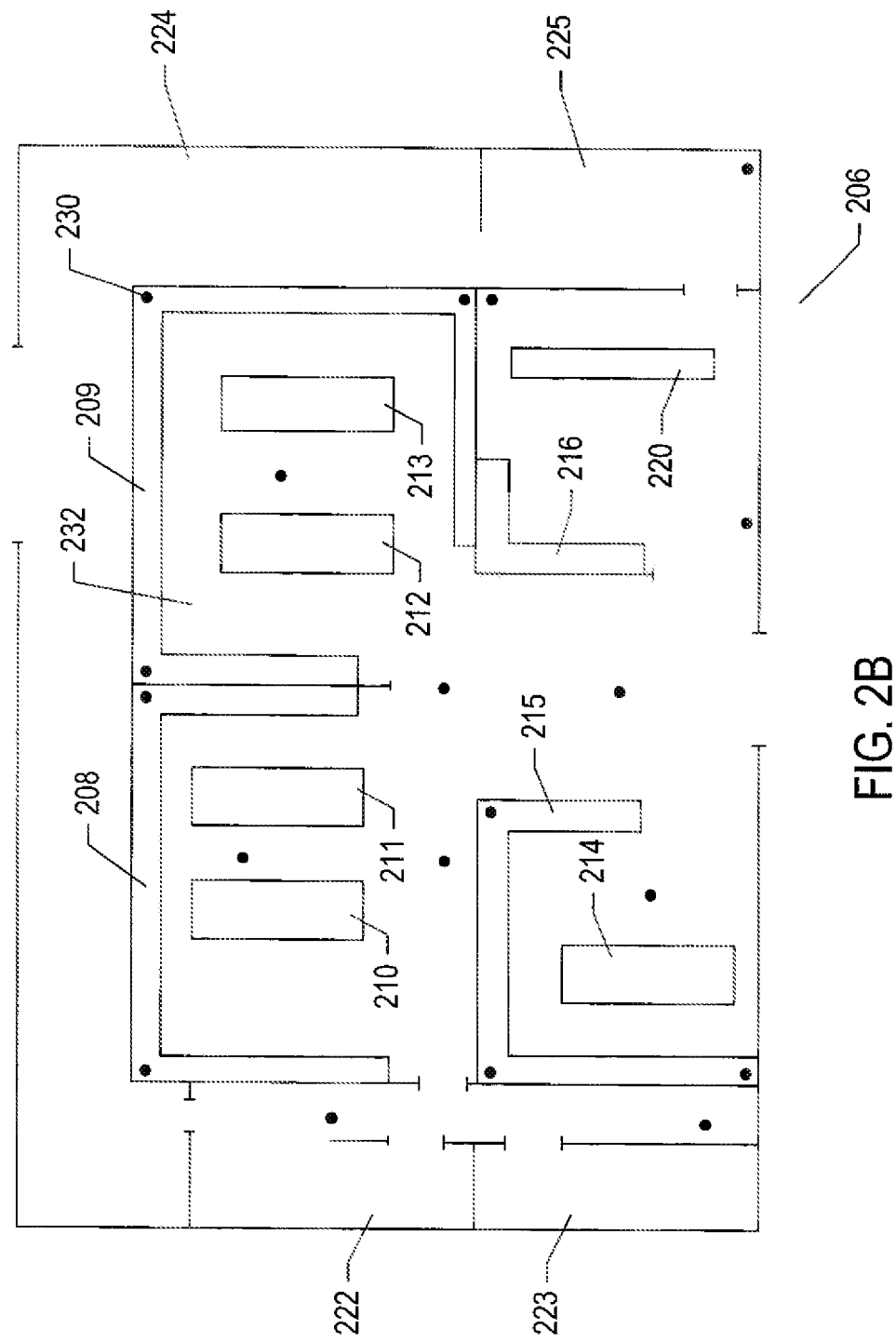

FIGS. 2A-B illustrate logical models of physical infrastructure. As shown in FIG. 2A, a product-display room 202 within the retail establishment, such as a display room for shoes in a shoe store or for hand-held electrical appliances in a hardware store, may be logically described as a set of shelves, such as shelf 204, each having dimensions, a location along one of the three walls, and load-bearing and accessibility attributes, among other attributes. Such models of display infrastructure may be useful in managing product display and inventory control. Alternatively, as shown in FIG. 2B, a floor in the retail establishment may be represented by a floor plan 206 showing the sizes and locations of shelves and other display features 208-216, a cashier counter 220, restrooms 222-223, storage space 224, a management office 225, and the locations of overhead security cameras, such as location 230 of a security camera in the upper right-hand corner of a product-display room 232. Many other representative models and maps may be used in traditional retail-establishment management. Often, the representations are intended for manual use by human managers and other personnel, but similar types of electronically encoded maps may be additionally employed by automated retail-administration-and-management systems. In general, these various types of representations are designed to represent different types of infrastructure within a retail establishment and are often used for different purposes. Quite often, they use different types of encodings and illustration conventions. While useful, these types of representations suffer many deficiencies, including lack of standardization, lengthy lag times associated with updating the information contained in the representations, and frequent discrepancies between the information contained in the representations and the actual physical infrastructure that is represented.

Figure 3:
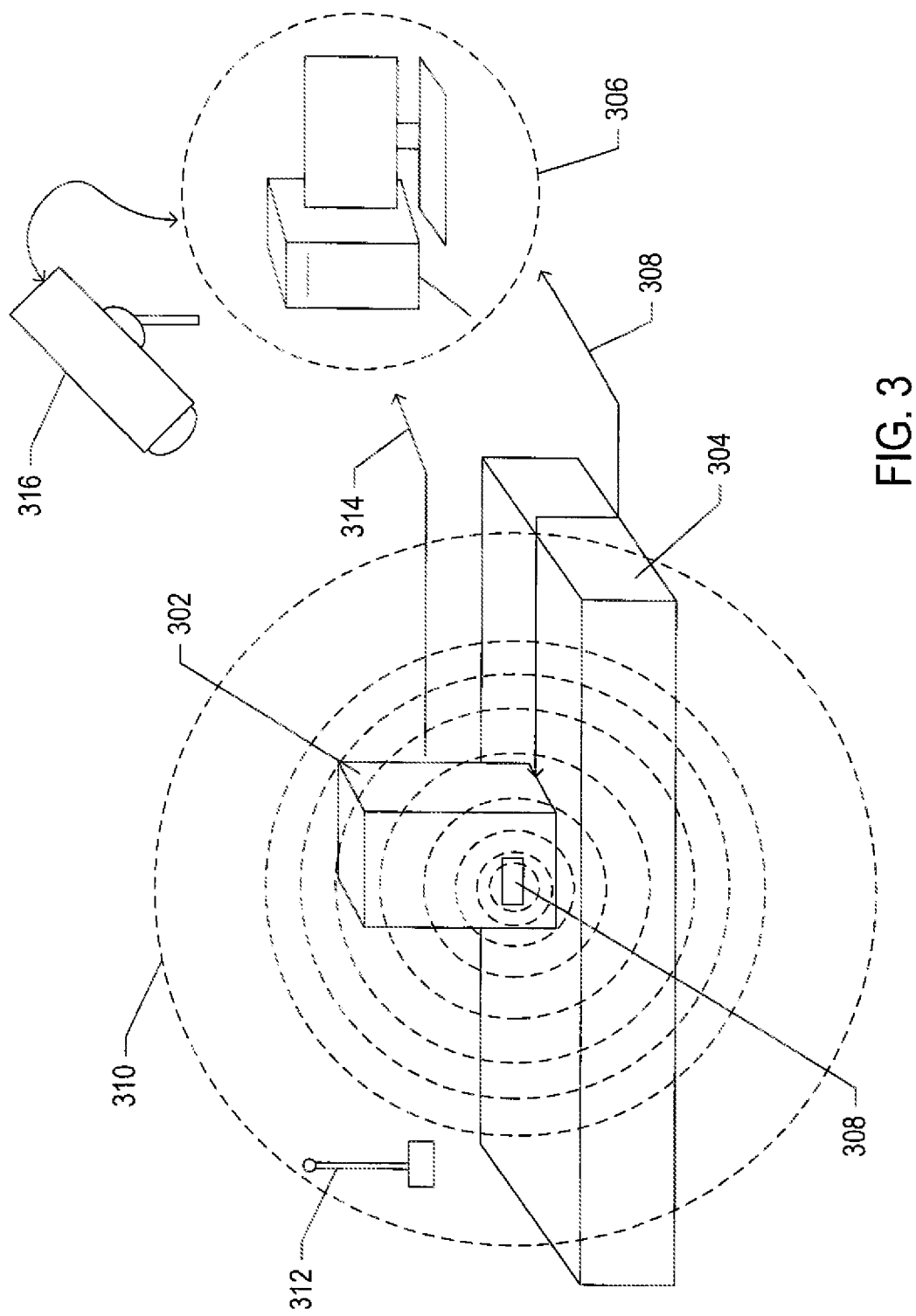
FIG. 3 shows various types of identification and monitoring technologies that may be employed within a retail establishment.

FIG. 3 shows various types of identification and monitoring technologies that may be employed within a retail establishment. Rectangular volume 302 is shown positioned on display shelf 304 and represents a product displayed for sale in the retail establishment, a device, such as a product-display device, or another item or entity within the retail establishment. Various types of monitoring technologies are used to return security signals to a local computer system 306 within the retail establishment that is used by administration and management personnel to monitor displayed products and other devices and entities. The product may be mechanically secured to the display shelf with a device that sends an electronic signal over a wire 308 to a signal-receiving device or component connected to the computer system 306. A radio-frequency-identification ("RFID") tag 308 may be attached to the product and may generate a radio-frequency signal, represented by dashed circles, such as dashed circle 310, that is received by an antenna 312 in relatively close proximity to the product display. Electronics associated with the antenna relay the signal through a wire 314 to the computer system or, alternatively, rebroadcast the signal through a local wireless network. The product may be monitored by a video camera 316 which transmits encoded video signals to the computer system. Many other types of monitoring technologies may be employed, including location monitors, accelerometers, and other sensors that report product location and product movement back to the computer system. In a large retail establishment, many different types of monitoring technologies may be used simultaneously, as a result of which many different types of hardware infrastructure may be employed.

Figure 4A:
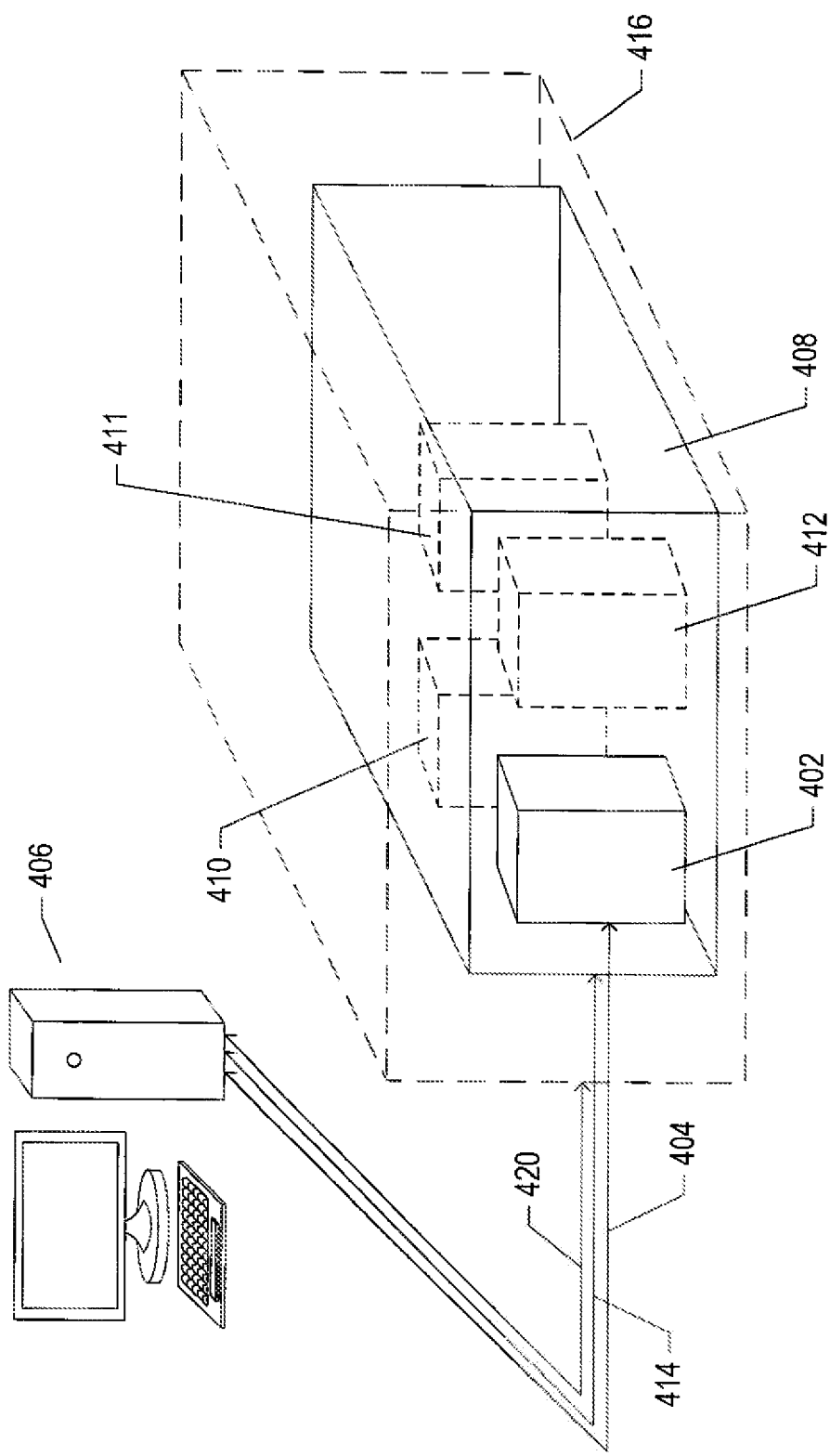
FIGS. 4A-B illustrate the hierarchical nature of monitoring technologies and other devices and subsystems used within physical infrastructure.
Figure 4B:
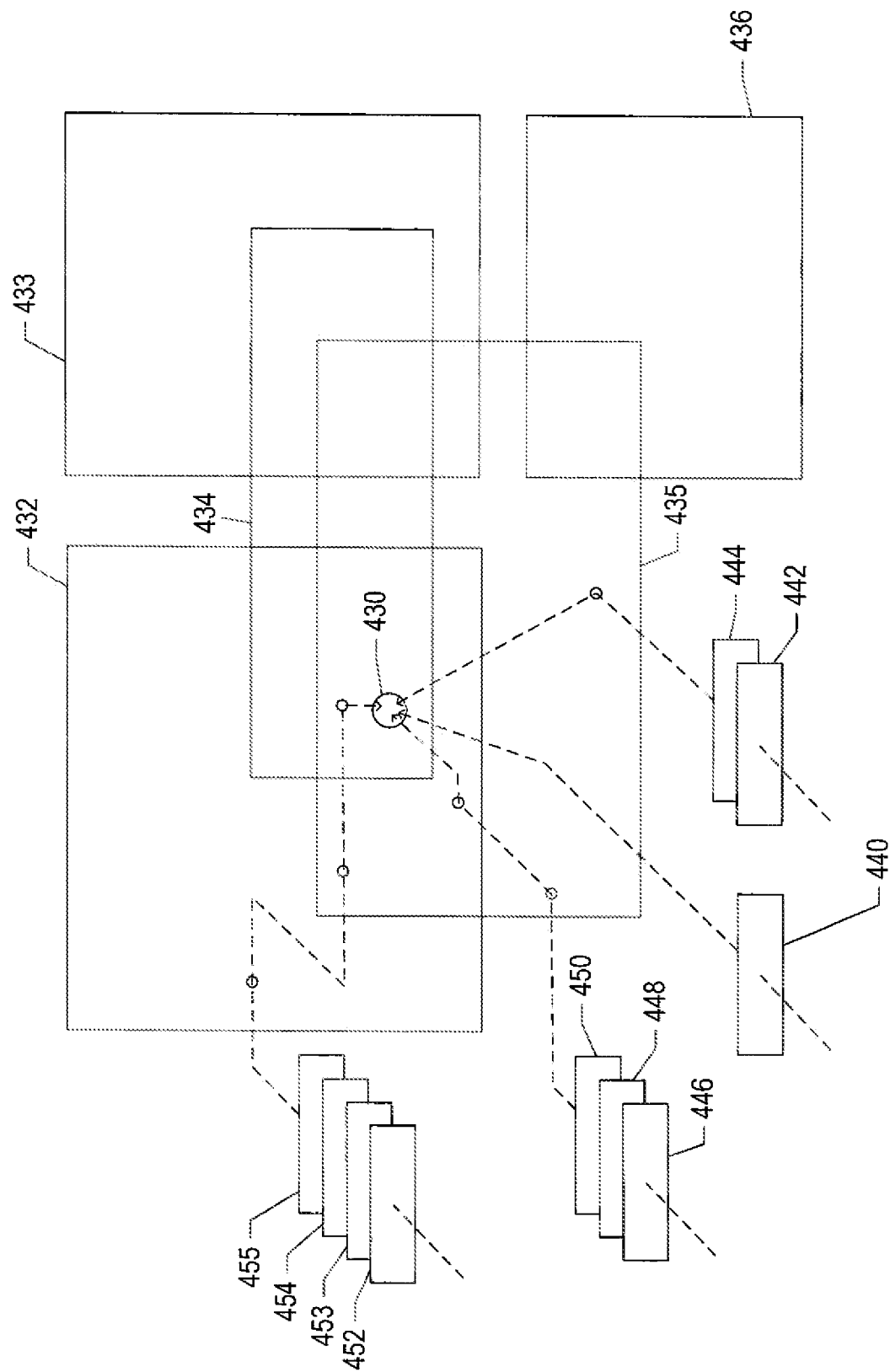

FIGS. 4A-B illustrate the hierarchical nature of monitoring technologies and other devices and subsystems used within physical infrastructure. As shown in FIG. 4A, a particular product, device, or subsystem 402 may directly communicate 404 with a computer system 406 within the retail establishment. The product, device, or subsystem 402 may be incorporated within a higher-level entity represented by closing rectangular volume 408. This higher-level entity may also include other products, devices, or subsystems 410-412. As one example, a product 402 may be displayed on a display rack 408 on which other similar products 410-412 are displayed. As another example, device 402 may be a security device that mounts a product for display that is interconnected with a security-device controller 408 that monitors attached security devices for various types of sieve security events, such as attempts to disconnect display products from security devices. The security-device controller 408, in turn, is connected 414 to the computer system 406. The higher-level entity 408 may itself be contained within event a higher-level entity 416. For example, in an alternative configuration, a floor-monitoring subsystem 416 may monitor signals from multiple security-device controllers 408 dispersed throughout a floor of a retail establishment and may be connected 420 to the computer system to transmit security events collected from all of the security devices located on the floor controlled by all of the security-device controllers located on the floor to the computer system. These are but a few examples of many different types of hierarchical and overlapping monitoring technologies, devices, items, and subsystems that may be simultaneously deployed within a retail establishment. This type of hierarchical nesting of technologies, devices, items, and subs stems may describe surveillance systems, inventory-control systems, and other such infrastructure. As with the different types of monitoring technologies discussed above with reference to FIG. 3, many different hierarchical organized infrastructure technologies that may be deployed within a retail establishment generally represent a large number of corresponding specialized hardware systems with associated maintenance and management requirements. Quite often, the many different hierarchical levels of deployed technology represent a very complex set of hardware infrastructures and interfaces that are difficult to represent using traditional logical models, such as those discussed above with reference to FIGS. 2A-B. and represent a complex and significant maintenance and management problem.

FIG. 4B illustrates interface problems and complexities associated with hierarchical and/or overlapping deployed technologies. In FIG. 4B, disk 430 represents a product or a device within a retail establishment. Rectangles 432-436 abstractly represent particular technology layers and subsystems that may control, monitor, or otherwise interact with the product or device 430. Overlaps between these rectangles represent overlapping of the particular types of technologies and subsystems. Smaller rectangles, such as rectangle 440, represent communications interfaces. The product or device 430 may, in certain cases, be directly accessible to the local computer system or systems that implement one or more control subsystems within the retail establishment through a device communications interface 440. Alternatively, the computer system or systems may need to access the device through an interface 442 to technology layer or subsystem 435 which, in turn, accesses the product or device 430 through an internal product-or-device interface 444. Alternatively, the local computer system or systems may need to access the product or device 430 through a first interface 446 to technology layer or subsystem 435, which accesses technology layer or subsystem 432 through a second interface 448, which, in turn, accesses the product or device 430 through a third internal interface 450. A final example involves four different interfaces 452-455 and three different technology-layers or subsystems 432, 435, and 434. In some cases, the product or device can be alternatively accessed by multiple of these different sets of interfaces through different combinations of technology layers and subsystems. All of this complexity can result in extremely complex implementations of infrastructure-administration-and-management applications running on the local computer system or systems within the retail establishment. If, for example, the retail establishment discovers a new technological layer that can partially replace one or more currently used technological layers, it may be exceedingly difficult or even infeasible to incorporate the new technological layer into the existing infrastructure-administration-and-management applications. Furthermore, it may be exceedingly difficult for programmers and system designers to attempt to understand, in the future, how all of the various technological layers and subsystems interact with one another and how the infrastructure-administration-and-management applications can be updated or improved in view of various deficiencies and problems that arise during usage. Often, replacement of technology layers and subsystems involves removal or alteration of physical hardware and installation of new physical hardware, which can be error-prone and extremely costly, and which can involve lengthy implementation time frames.

Figure 5:
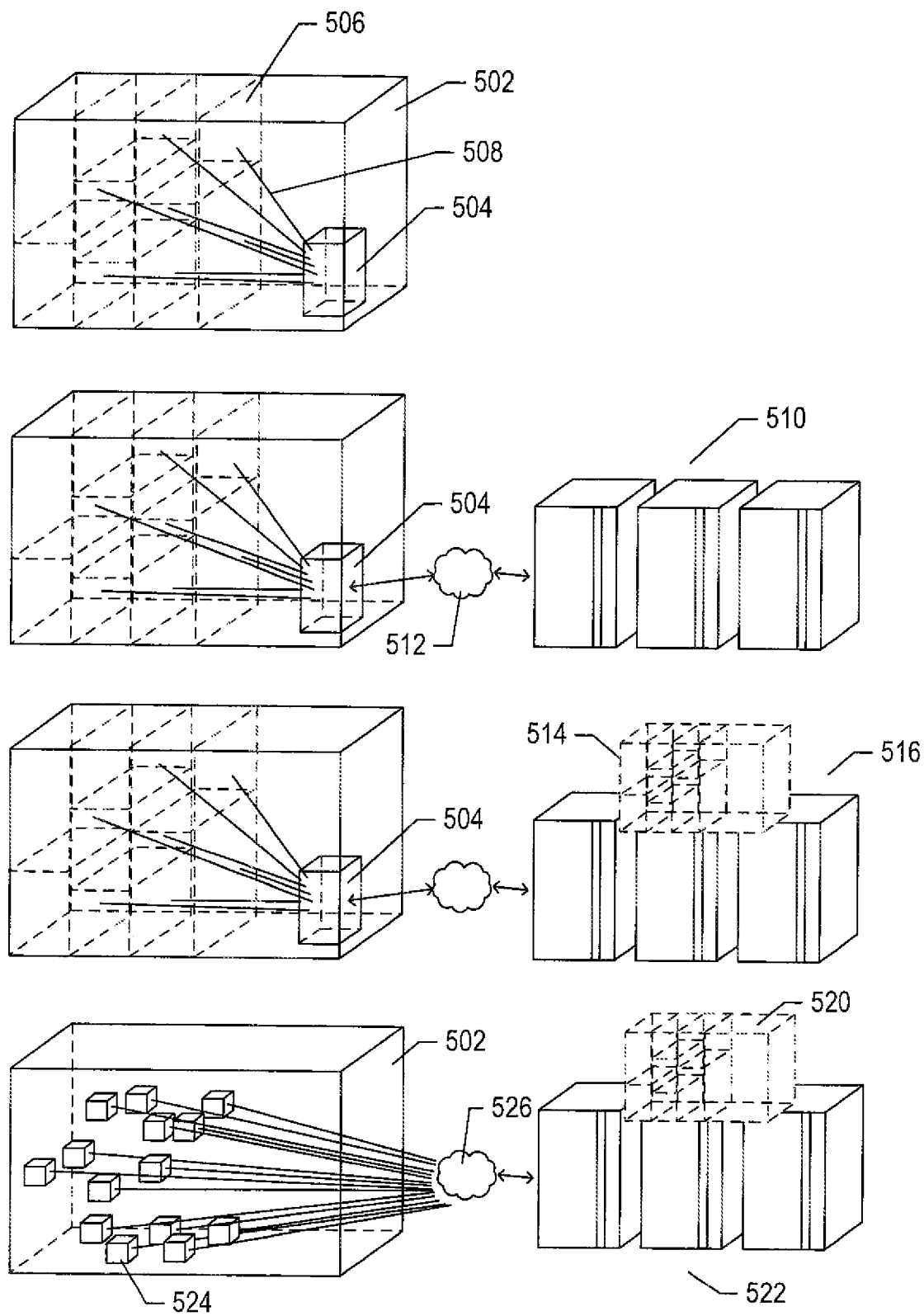
FIG. 5 illustrates previous approaches and the currently disclosed approach to physical-infrastructure control and management.

FIG. 5 illustrates previous approaches and the currently disclosed approach to physical-infrastructure control and management. Initially, a physical infrastructure 502x was managed entirely internally by one or more local computer systems 504. In this representation, the internal partitions demarcated with dashed lines, such as partition 506, represent technology layers and/or subsystems that each includes various products and/or devices or lower-level subsystems. Line segments, such as line segment 508, represent communications connections between the one or more local computer systems 504 and the technology layers and/or subsystems. With the availability of remote data centers and cloud-computing facilities, it has been possible to connect the one or more local computer systems 504 with external computing facilities 510 through electronic communications 512 in order to back up and archive data and use other types of remote computational facilities to augment or supplement the local computer systems 504. In some cases, further developments allow for storage of infrastructure maps and models 514 in external computing facilities 516 and even for calling various types of external applications and routines executing within the external computing facilities to assist the local computer systems 504 in administration-and-management tasks and operations. However, even in this case, actual infrastructure control is still carried out by the one or more local computer systems 504 via numerous different types of technology layers and subsystems physically located within the physical infrastructure.

The currently disclosed approach to physical-infrastructure control and management is quite different from past and current approaches to physical-infrastructure control and management. In this approach, the entire physical infrastructure 502 is essentially moved 520 to a cloud-computing facility 522. No longer do the various products, devices, and subsystems within the physical infrastructure need to be controlled and managed by one or more local computer systems. Instead, the products, devices, and subsystems, represented by small cubes, such as cube 524, directly communicate through electronic communications, such as the Internet 526, with management-and-control applications running within the cloud-computing facility 522. However, the management-and-control operations are directly applied to the virtual infrastructure 520 that resides within the cloud-computing facility. A byproduct of that direct application is propagation of control signals and information back to the products, devices, and subsystems within the physical infrastructure. In essence, by directly controlling the virtual infrastructure within the cloud-computing facility, that control propagates back to the physical infrastructure 502 and results in indirect control of the physical infrastructure.

The currently disclosed approach to physical-infrastructure control and management provides many advantages. First, this approach completely separates control-and-management logic and implementation from the physical infrastructure. Control-and-management systems and logic can be built entirely virtually to control and manage the virtual infrastructure without concern for myriad low-level details, including hardware and communications interfaces, specific hardware functionalities and capabilities, and other such details. Similarly, new types of hardware systems can be incorporated within the physical infrastructure independently of the control-and-management systems and logic running within the cloud-computing facility. As new hardware systems are added to the physical infrastructure, and older hardware systems removed or disabled, information about the current hardware-system capabilities automatically propagates back to the cloud-computing facility and control-and-management systems running within it. This information is relatively abstract, and can be easily incorporated into the control-and-management systems running within the cloud-computing facility. The control-and-management systems enjoy all of the fundamental features of remote cloud-computing facilities, including high-availability, fault tolerance, straightforward scalability, and economic efficiency. Enormous amounts of frustrating and expensive maintenance and management efforts required to maintain and manage physical hardware subsystems and local control-and-management applications running within a local computer systems are no longer needed. Furthermore, rapid development of control-and-management applications running within the cloud-getting facility can be straightforwardly multiplexed over many different physical-infrastructure instances. In the retail-establishment example, a large corporation can manage many different local retail outlets using the same control-and-management applications running within the cloud-computing facility.

Figure 6A:
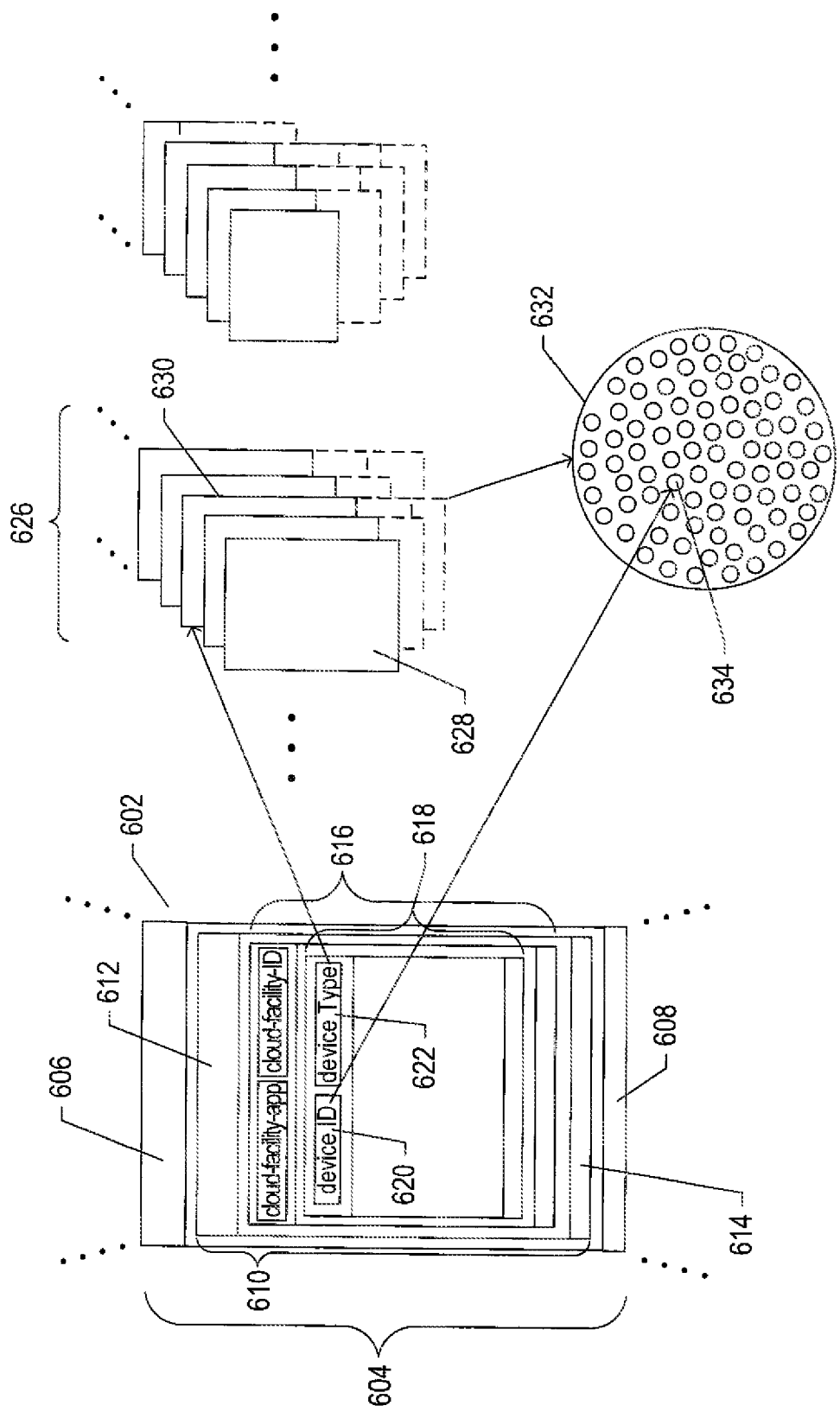
FIGS. 6A-B illustrate certain of the design and implementation strategies that facilitate the currently described approach to physical-infrastructure control and management.
Figure 6B:
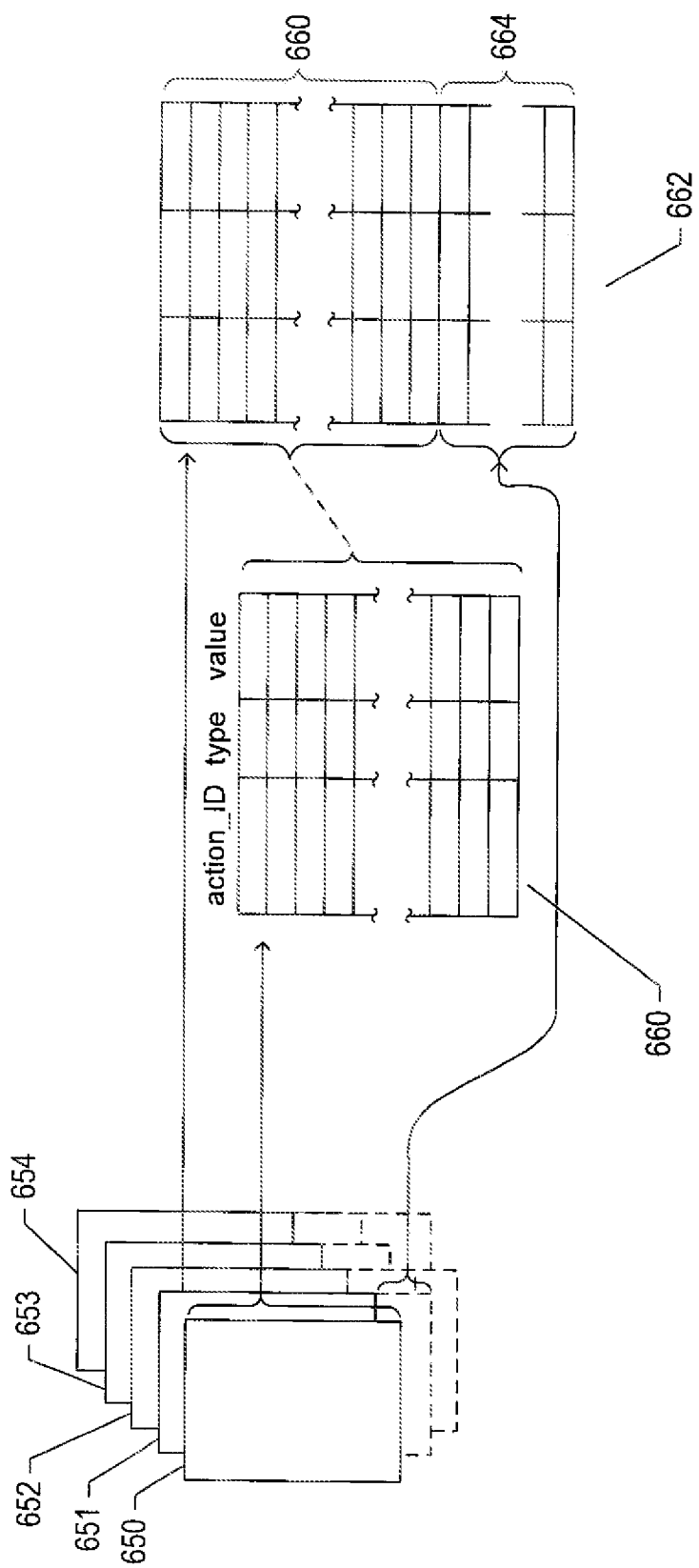

FIGS. 6A-B illustrate certain of the design and implementation strategies that facilitate the currently described approach to physical-infrastructure control and management. As shown in FIG. 6A, modern electronic communications involves a hierarchical protocol structure 602 that is reflected in the structure of the communications packets transmitted through electronic-communications media. Each different protocol is associated with a particular packet format. For example, packet format 604 may correspond to a network-layer protocol. The network-layer protocol packet includes a header 606 and possibly a footer 608 as well as data. The data 610 is a packet of a higher-level protocol, in this example, a transport-layer protocol. The transport-layer protocol also includes a header 612 and possibly a footer 614. The data for the transport-layer protocol, in this example, is an application-layer packet 616. The currently disclosed approach to physical-infrastructure control and management uses an additional infrastructure-management protocol layer and corresponding packet format 618. The header of an infrastructure-and management protocol-layer packet includes a device identifier 620 and a device type 622. Devices, products, and subsystems within physical infrastructure are represented by objects, such as object-oriented-programming-implemented objects. Each different device type 626 is associated with a base object 628, which includes functionality common to all the different subtypes of the device type, as well as with an object type corresponding to the particular device subtype, with subtype objects inheriting the common functionality from the base type through class inheritance. The device-type field 622 in the infrastructure-management protocol-layer header includes a first subfield that identifies the device type and a second subfield that identifies the particular object type of the device, product, or subsystem to which the communications packet is addressed or from which the communications packet is received. Thus, in the example shown in FIG. 6A, the contents of the device-type field 622 indicates the general device type 626 and the object type 630 corresponding to the particular subtype of the device, product, or subsystem. That subtype may correspond, at any point in time, to a large collection of subtype instances 632 within the virtual infrastructure (520 in FIG. 5). The device-ID field 620 in the infrastructure-management protocol-layer packet identifies the particular instance 634 to which the infrastructure-management protocol-layer packet is to be sent or from which the infrastructure-management protocol-layer packet was transmitted. The infrastructure-management protocol level provides for efficient and rapid communications between physical products, devices, and subsystems within the physical infrastructure (502 in FIG. 5) and corresponding virtual products, devices, and subsystems in the virtual infrastructure (520 in FIG. 5). The infrastructure-management protocol-layer represents a first new communications interface that is used to implement the currently disclosed approach to physical-infrastructure control and management.

FIG. 6B illustrates a second new communications interface used to implement the currently disclosed approach to physical-infrastructure control and management. This second interface provides an attribute/attribute-value interface to each of the virtual products, devices, and subsystems in the virtual infrastructure. As shown in FIG. 6B, the base object 650 and sub-type objects 651-654 for a general type of product, device, or subsystem are mapped to attribute/attribute-value sets, such as attribute/attribute-value set 660 corresponding to the base object 650. The attribute/attribute-value set 662 corresponding to subtype object 651 includes attribute/attribute-value set 664 the base object as well as additional attributes 664 unique to the subtype. As an example, the base object 650 may include a function activateAlarm( ), which causes a product, device, or subsystem represented by the base object to generate an alarm signal, and a function deActivateAlarm( ), which causes the product, device, or subsystem represented by the base object to discontinue generating the alarm signal. The set of attributes and attributes values 660 may include an attribute alarm of type Boolean. When the control-and-management application sets the attribute alarm for a particular virtual product, device, or subsystem in the virtual infrastructure to TRUE, the function activateAlarm( ) is called for the underlying object instantiation, resulting in propagation of a control signal to the corresponding physical product, device, or subsystem to activate its alarm. The mapping between objects and attribute/attribute-value sets can be used for information transfer both from the physical infrastructure to the virtual infrastructure and from the virtual infrastructure to the physical infrastructure. It is this mapping that allows the virtual infrastructure to mirror the physical infrastructure and that allows the operations and commands directed by the control-and-management application to the virtual infrastructure to be propagated to the physical infrastructure. The attribute/attribute-value description of virtual-infrastructure entities is general, and allows the virtual infrastructure to represent any attributes and characteristics of the physical infrastructure, eliminating the need for traditional representations discussed above with reference to FIGS. 2A-B.

Figure 7:
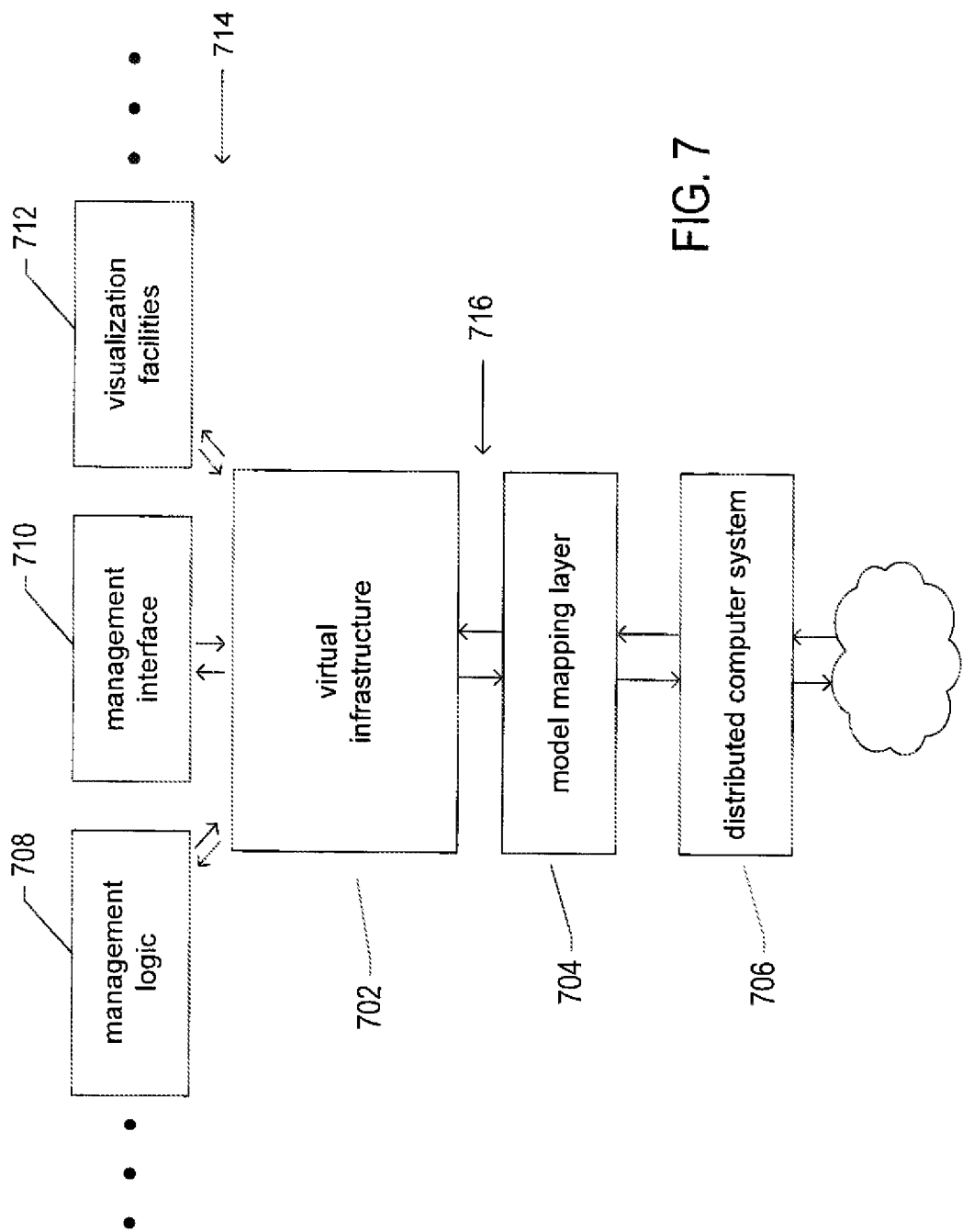
FIG. 7 illustrates implementation of the currently disclosed approach to control and management of physical infrastructure.

FIG. 7 illustrates implementation of the currently disclosed approach to control and management of physical infrastructure. The architecture diagram shown in FIG. 7 pertains to the control-and-management application and other applications as well as the virtual infrastructure within a cloud-computing facility. An important component of the implementation, as indicated above, is the virtual infrastructure 702, somewhat similar to a live computational model of the physical infrastructure, but essentially an independent virtual infrastructure that operates in parallel to the physical infrastructure. The virtual infrastructure includes instantiated objects corresponding to products, devices, and subsystems in the physical infrastructure. A model-mapping layer 704 is responsible for mapping instantiated-object data members and function members to data packets transmitted to products, devices, and subsystems within the physical infrastructure and mapping data packets received from the physical infrastructure to instantiated-object data members and function members in the virtual infrastructure. As new types of physical hardware devices are incorporated into the infrastructure-management protocol and interface standard, the mapping may be relatively direct, because the object data members and function members directly map to entry points in the physical-hardware-device command interface. However, less direct mappings can be used to map the object interfaces of the instantiated objects in the virtual infrastructure to legacy physical hardware. The model-mapping layer 704 transmits and receives communications messages via common communications protocols, such as the TCP/IP stack, via distributed-operating-system interfaces provided by the distributed computer system 706.

Higher-level components, including management-and-control logic 708, a management interface 710 that provides management interfaces to human administrators and managers of physical infrastructure, and visualization facilities 712 that provide various types of visual renderings of physical infrastructure or portions of physical infrastructure for display to users are all implemented above the virtual-infrastructure layer 702. The visualization facilities, for example, may allow users to view portions of, or an entire, physical infrastructure using a three-dimensional virtual-reality headset, haptic glove, three-dimensional holographic display, or more traditional two-dimensional displays. Visualization facilities may attempt to provide photograph-like representations of the appearance of the physical infrastructure from selected vantage points, real-time video from the physical infrastructure, or any number of visual representations designed to display selected types of information in ways that do not necessarily reflect the appearance of the physical infrastructure. These higher-level components interact with the virtual-infrastructure layer via attributes and attribute values associated with virtual devices, products, and subsystems within the virtual infrastructure. Of course, the renderings of virtual-infrastructure and aspects of the virtual infrastructure may be provided to higher-level automated systems, robots, and other non-human consumers in encodings and formats suitable for non-human consumers.

The management-and-control logic 708 may incorporate a wide variety of different types of control logic. Control logic may comprise, in part, rules and policies that are applied to the virtual infrastructure and, through the virtual infrastructure, to the physical infrastructure. Control logic can also be implemented programmatically. In many cases, programmatic control implementations may incorporate a wide variety of artificial intelligence and machine learning to facilitate goal-directed management that can be more easily obtained by machine learning than by deterministic, programmed logic.

The interface between the virtual infrastructure and the higher-level components 714 is based on the above-described attribute/attribute-value sets associated with different types of virtual-infrastructure entities while the interface 716 between the virtual infrastructure 702 and the model-mapping layer 704 is based on the object model for virtual-infrastructure entities. Thus, the detailed interface between the virtual infrastructure and the physical infrastructure is isolated in the model-mapping layer 704 rather than dispersed throughout the control-and-management system. It is important to note that the virtual infrastructure need not correspond, via a one-to-one mapping, to the physical infrastructure. For example, many types of virtual devices and subsystems may be designed and incorporated into the virtual infrastructure that have no physical-infrastructure counterparts. These can be used to simplify control logic, to test new component designs, and for many other purposes. Moreover, the virtual infrastructure can include virtual personnel, robots, and other active entities in addition to virtual analogues of physical devices and subsystems. Information directed to such active entities can be directed to actual human personnel, robots, and other active entities in the physical infrastructure. As one example, it may be convenient to include a virtual maintenance person in the virtual infrastructure to which alarms and notifications can be directed and from whom confirmation of ameliorative actions can be received. The actions of the virtual maintenance person may be distributed across various human personnel associated with the physical infrastructure by the model-mapping layer.

Thus, control and management of physical infrastructure occurs primarily within a cloud-computing facility. Human administrators and managers access the management interface provided by the cloud-computing facility, rather than local interfaces provided by computer systems in the physical infrastructure, and control-and-management operations and commands are executed with respect to the virtual infrastructure residing within the cloud-computing facility. Only relatively low-level communications occur between the model-mapping layer and products, devices, and subsystems within the physical infrastructure. Developers are thus freed from the complexities and constraints of local technology layers and physical hardware devices and can implement many different types of management, monitoring, security, and control systems entirely in software. Hardware designers are also freed from needing to consider details of integration of physical hardware devices into complex control-and-management systems, but need only develop the physical hardware devices to provide a standardized functionality interface and an infrastructure-management-protocol communications interface.

FIGS. 8-12B illustrates computer systems and cloud-computing facilities. The following discussion provides an overview of the type of computational machinery used to implement the management applications and visualization applications that together comprise an application-level layer (708, 710, and 712 in FIG. 7), and the virtual infrastructure (702 in FIG. 7), the model-mapping layer (704 in FIG. 7) of the currently disclosed physical-infrastructure control and management system discussed above with reference to FIGS. 5-7. As discussed above, the distributed computer system (706 in FIG. 7) that implements the currently disclosed physical-infrastructure control and management system is most generally and most flexibly implemented in a cloud-computing facility comprising one or more physical and virtual data centers.

The terms "abstraction" and "abstract" are not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

Figure 8:
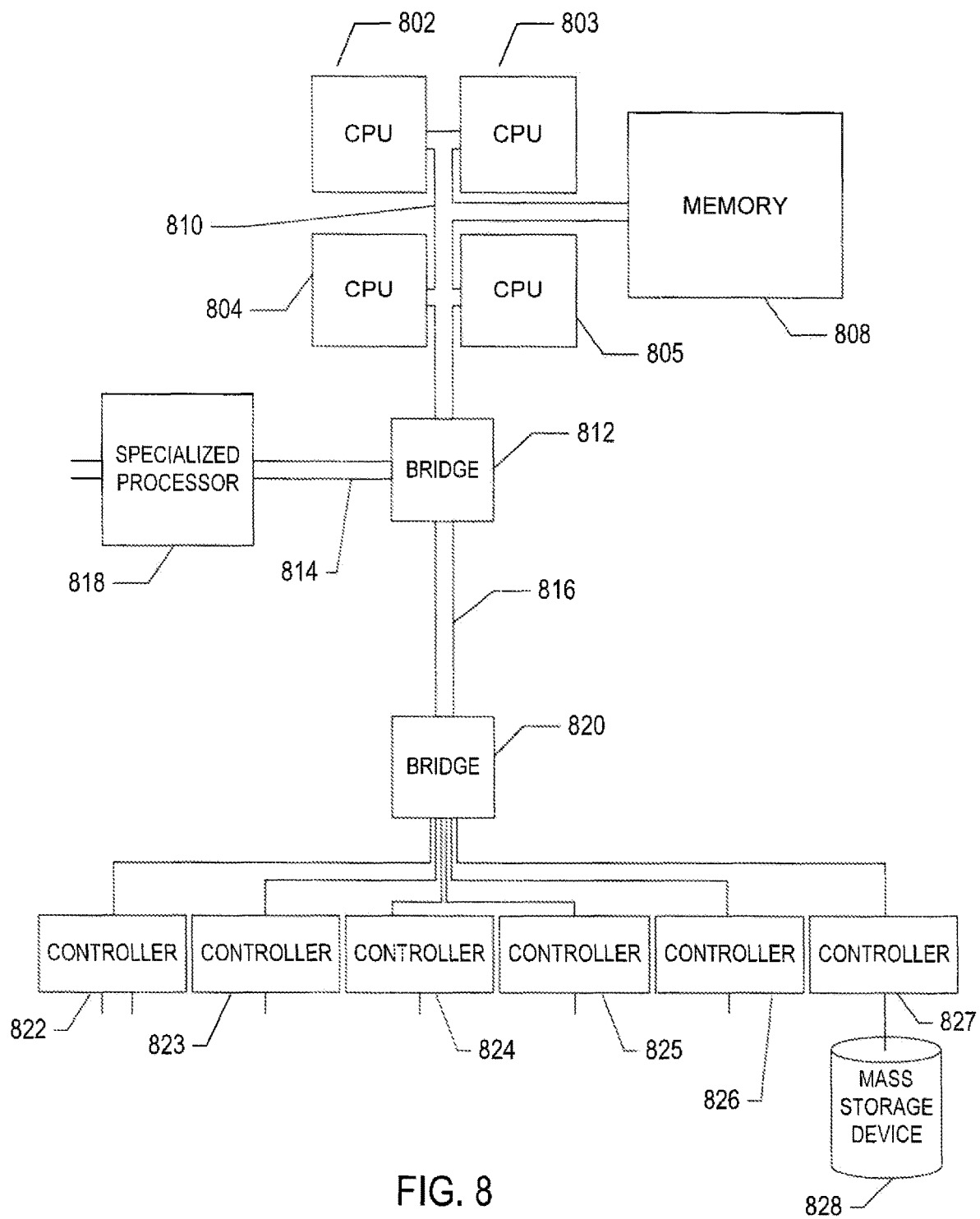
FIG. 8 provides a general architectural diagram for various types of computers.

FIG. 8 provides a general architectural diagram for various types of computers. The computer system contains one or multiple central processing units ("CPUs") 802-805, one or more electronic memories 808 interconnected with the CPUs by a CPU/memory-subsystem bus 810 or multiple busses, a first bridge 812 that interconnects the CPU/memory-subsystem bus 810 with additional busses 814 and 816, or other types of high-speed interconnection media, including multiple, high-speed serial interconnects. These busses or serial interconnections, in turn, connect the CPUs and memory with specialized processors, such as a graphics processor 818, and with one or more additional bridges 820, which are interconnected with high-speed serial links or with multiple controllers 822-827, such as controller 827, that provide access to various different types of mass-storage devices 828, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 9:
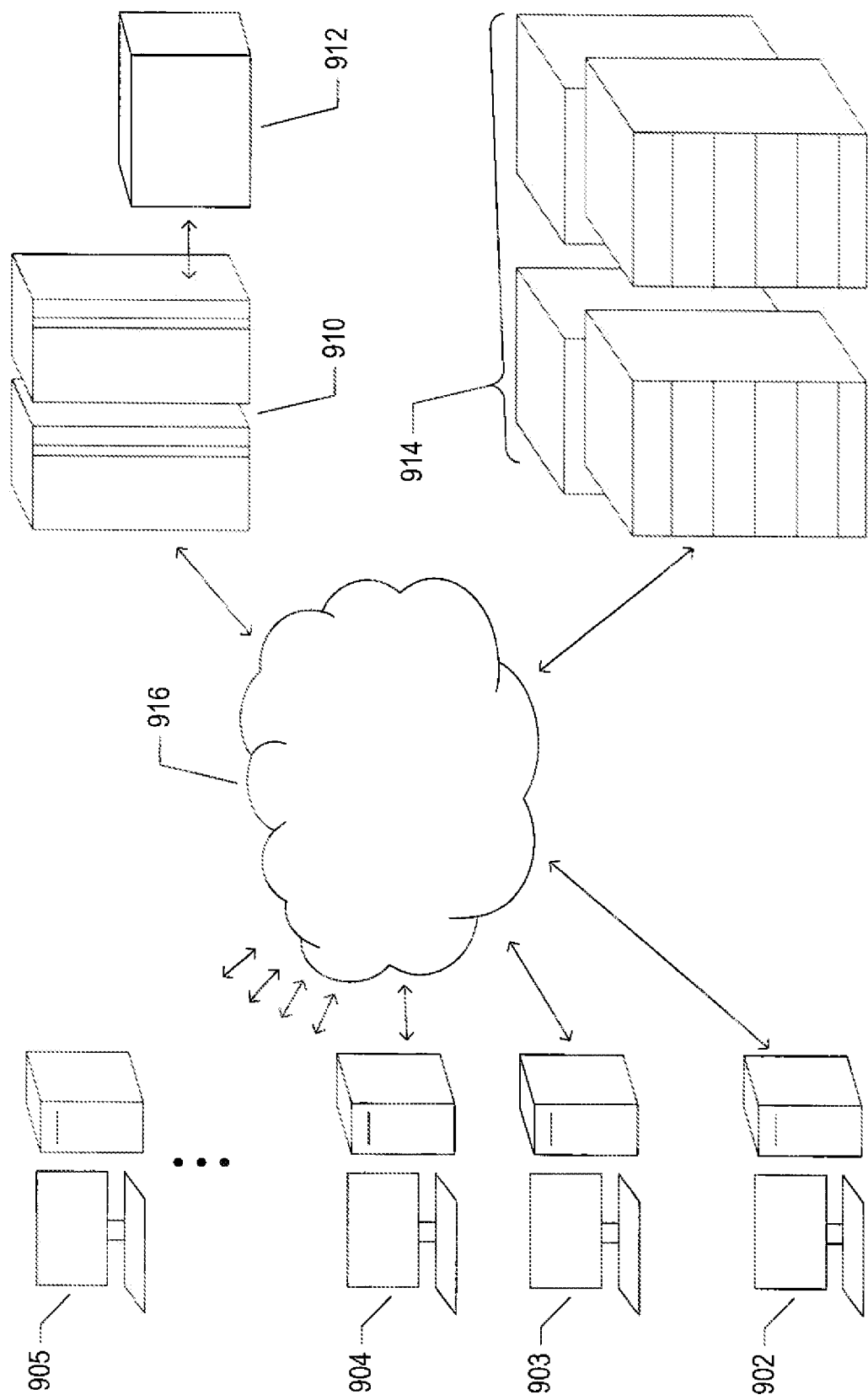
FIG. 9 illustrates an Internet-connected distributed computing system.

FIG. 9 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 9 shows a typical distributed system in which a large number of PCs 902-905, a high-end distributed mainframe system 910 with a large data-storage system 912, and a large computer center 914 with large numbers of rack-mounted servers or blade servers all interconnected through various communications and networking systems that together comprise the Internet 916. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 10:
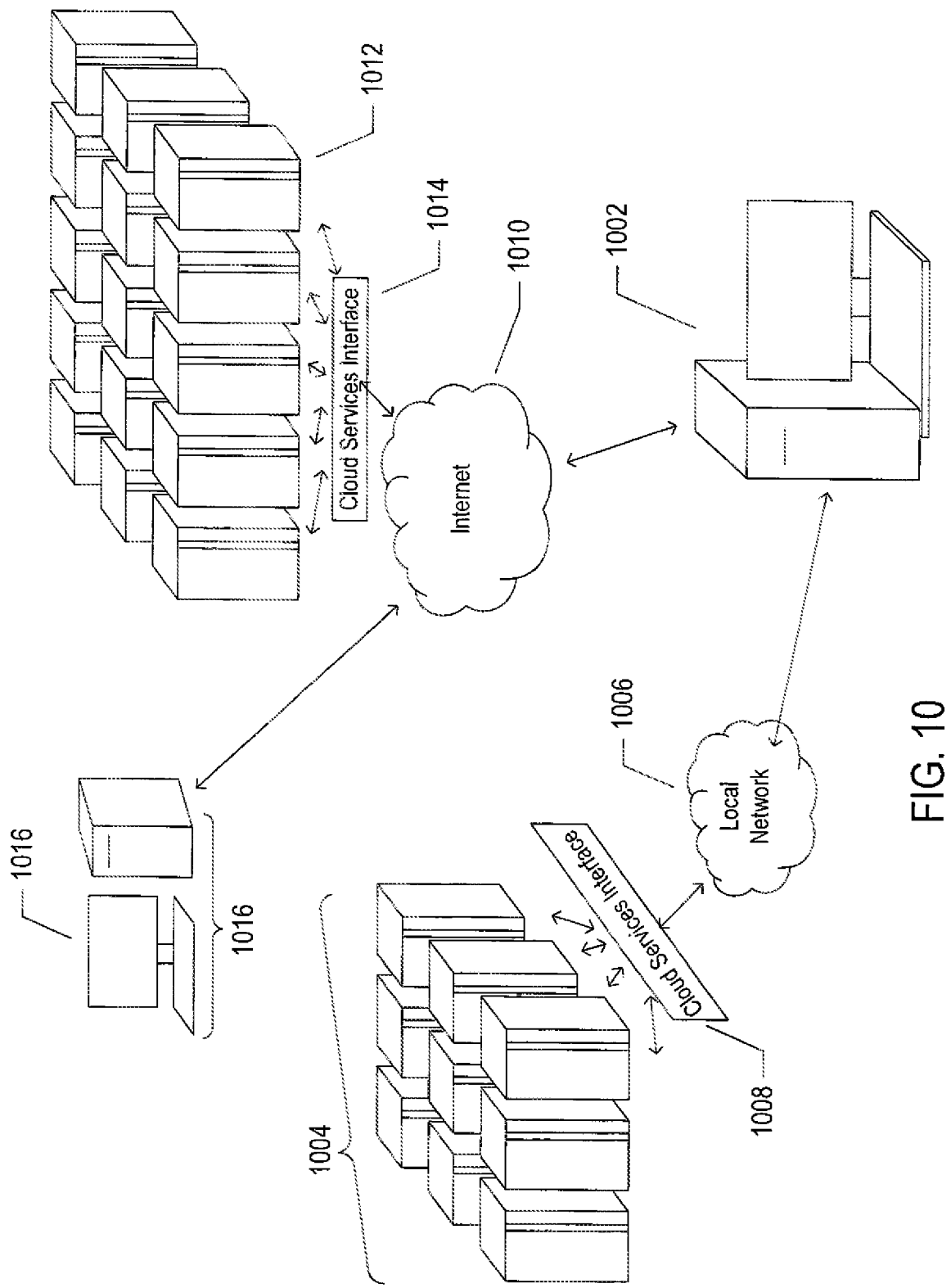
FIG. 10 illustrates cloud computing.

FIG. 10 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 10, a system administrator for an organization, using a PC 1002, accesses the organization's private cloud 1004 through a local network 1006 and private-cloud interface 1008 and also accesses, through the Internet 1010, a public cloud 1012 through a public-cloud services interface 1014. The administrator can, in either the case of the private cloud 1004 or public cloud 1012, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 1016.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 11:
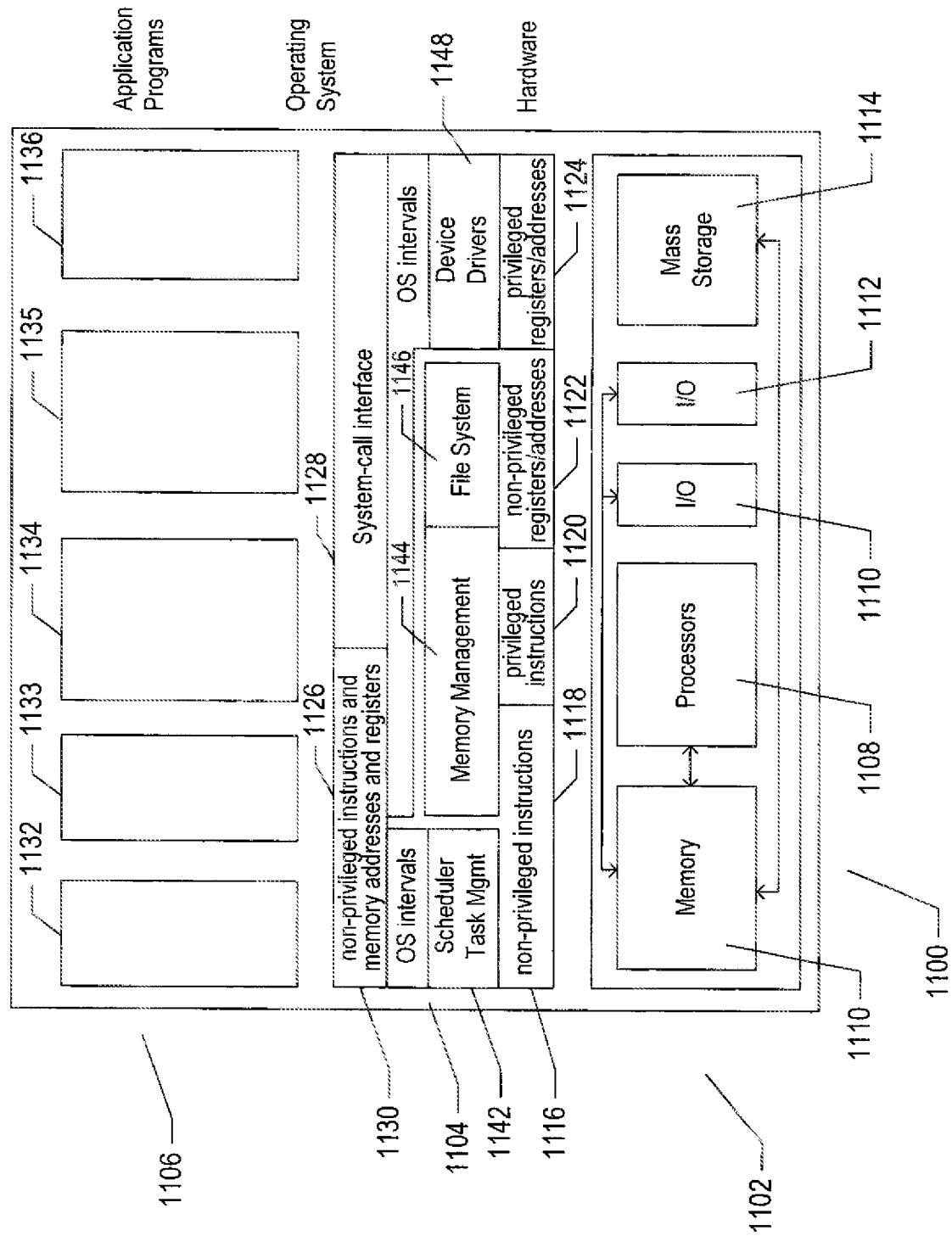
FIG. 11 illustrates generalized hardware and software components of a general-purpose computer system, such as a general-purpose computer system having an architecture similar to that shown in FIG. 1.

FIG. 11 illustrates generalized hardware and software components of a general-purpose computer system, such as a general-purpose computer system having an architecture similar to that shown in FIG. 1. The computer system 1100 is often considered to include three fundamental layers: (1) a hardware layer or level 1102; (2) an operating-system layer or level 1104; and (3) an application-program layer or level 1106. The hardware layer 1102 includes one or more processors 1108, system memory 1110, various different types of input-output ("I/O") devices 1110 and 1112, and mass-storage devices 1114. Of course, the hardware level also includes many other components, including power supplies, internal communications links and busses, specialized integrated circuits, many different types of processor-controlled or microprocessor-controlled peripheral devices and controllers, and many other components. The operating system 1104 interfaces to the hardware level 1102 through a low-level operating system and hardware interface 1116 generally comprising a set of non-privileged computer instructions 1118, a set of privileged computer instructions 1120, a set of non-privileged registers and memory addresses 1122, and a set of privileged registers and memory addresses 1124. In general, the operating system exposes non-privileged instructions, non-privileged registers, and non-privileged memory addresses 1126 and a system-call interface 1128 as an operating-system interface 1130 to application programs 1132-1136 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 1142, memory management 1144, a file system 1146, device drivers 1148, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 1136 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 12A:
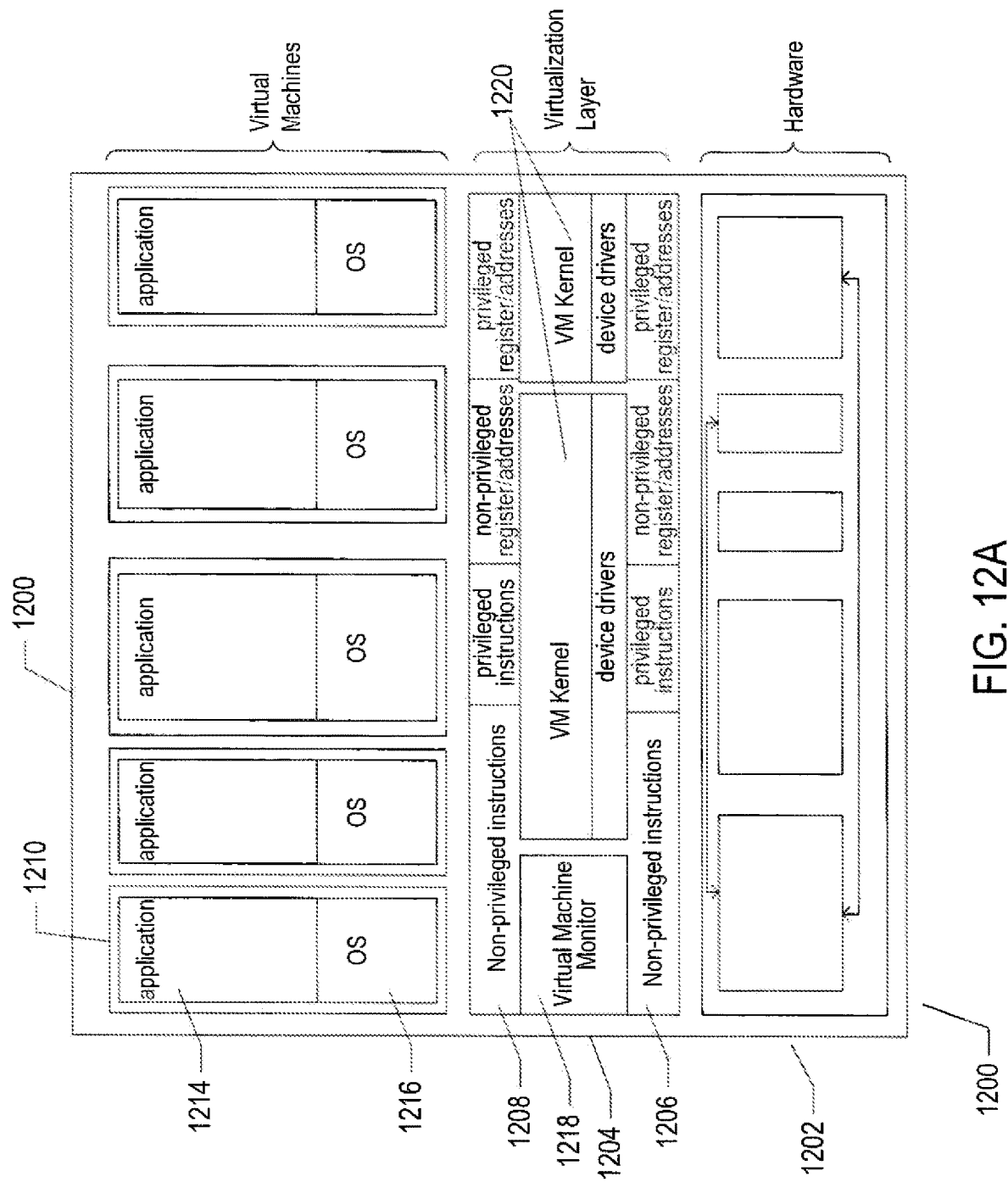
FIGS. 12A-B illustrate two types of virtual machine and virtual-machine execution environments.
Figure 12B:
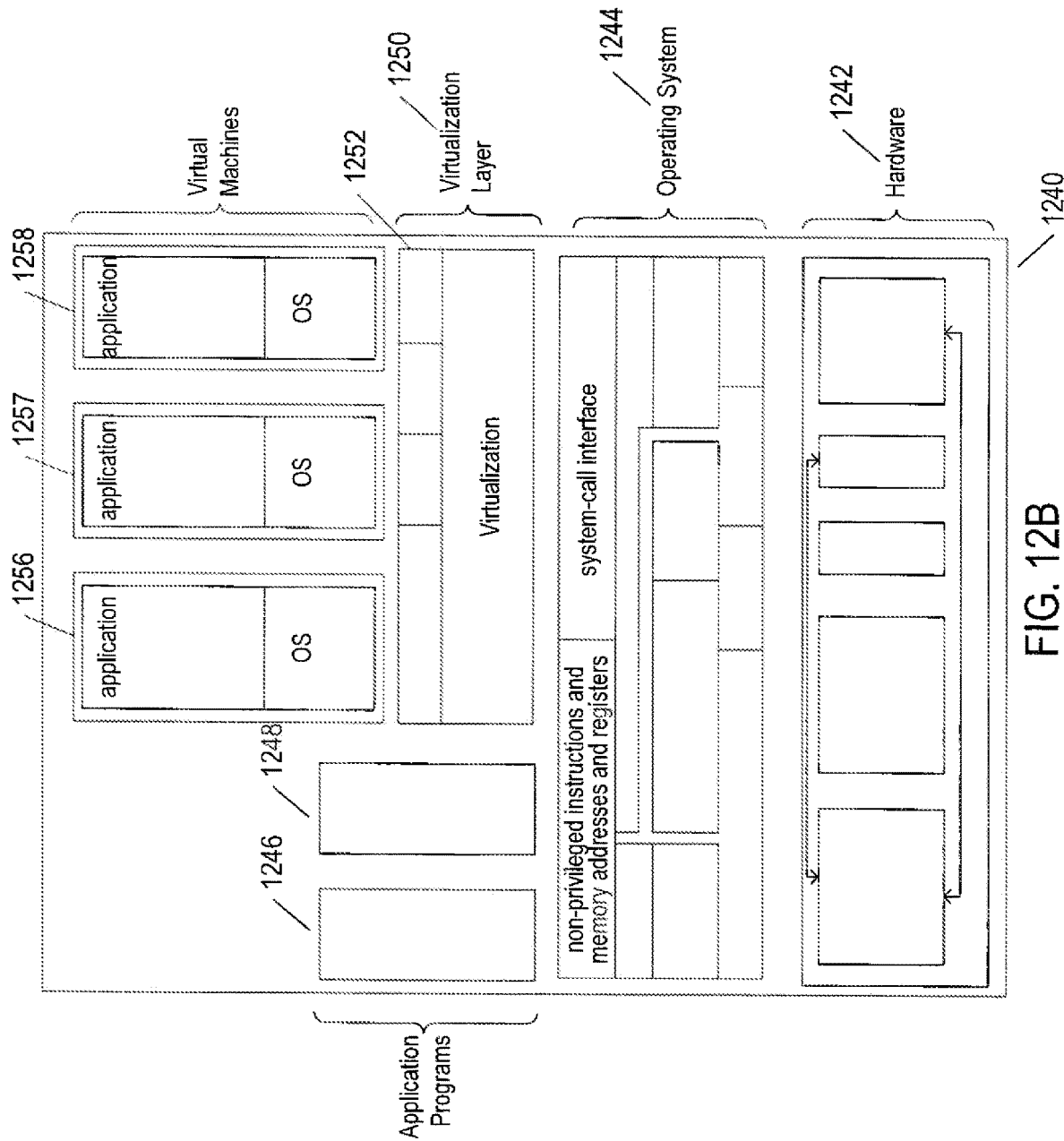

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 12A-B illustrate several types of virtual machine and virtual-machine execution environments. FIGS. 12A-B use the same illustration conventions as used in FIG. 11. FIG. 12A shows a first type of virtualization. The computer system 1200 in FIG. 12A includes the same hardware layer 1202 as the hardware layer 1102 shown in FIG. 11. However, rather than providing an operating system layer directly above the hardware layer, as in FIG. 11, the virtualized computing environment illustrated in FIG. 12A features a virtualization layer 1204 that interfaces through a virtualization-layer/hardware-layer interface 1206, equivalent to interface 1116 in FIG. 11, to the hardware. The virtualization layer provides a hardware-like interface 1208 to a number of virtual machines, such as virtual machine 1210, executing above the virtualization layer in a virtual-machine layer 1212. Each virtual machine includes one or more application programs or other higher-level computational entities packaged together with an operating system, referred to as a "guest operating system," such as application 1214 and guest operating system 1216 packaged together within virtual machine 1210. Each virtual machine is thus equivalent to the operating-system layer 1104 and application-program layer 1106 in the general-purpose computer system shown in FIG. 11. Each guest operating system within a virtual machine interfaces to the virtualization-layer interface 1208 rather than to the actual hardware interface 1206. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 1208 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 1218 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 1208, the accesses result in execution of virtualization-layer code to simulate or emulate the privileged resources. The virtualization layer additionally includes a kernel module 1220 that manages memory communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 12B illustrates a second type of virtualization. In FIG. 12B, the computer system 1240 includes the same hardware layer 1242 and software layer 1244 as the hardware layer 1102 shown in FIG. 11. Several application programs 1246 and 1248 are shown running in the execution environment provided by the operating system. In addition, a virtualization layer 1250 is also provided, in computer 1240, but, unlike the virtualization layer 1204 discussed with reference to FIG. 12A, virtualization layer 1250 is layered above the operating system 1244, referred to as the "host OS," and uses the operating system interface to access operating-system-provided functionality as well as the hardware. The virtualization layer 1250 comprises primarily a VMM and a hardware-like interface 1252, similar to hardware-like interface 1208 in FIG. 5A. The virtualization-layer/hardware-layer interface 1252, equivalent to interface 1116 in FIG. 11, provides an execution environment for a number of virtual machines 1256-1258, each including one or more application programs or other higher-level computational entities packaged together with a guest operating system.

The present invention has been described in terms of particular embodiments, it is not intended that the invention be limited to these embodiments. Modifications within the spirit of the invention will be apparent to those skilled in the art. For example, any of many different implementations of the above-disclosed physical-infrastructure control and management methods and systems can be obtained by varying various design and implementation parameters, including modular organization, control structures, data structures, hardware, operating system, and virtualization layers, and other such design and implementation parameters.

The invention claimed is:

1. A physical-infrastructure control and management system comprising:
application-level components, including one or more management applications, a management-interface application, and a visualization application, one or more management applications applying management operations directly to a virtual infrastructure, wherein the management operations applied to the virtual infrastructure result in propagation of control signals and information to the products, devices, and subsystems within the physical infrastructure;
the virtual infrastructure, to which the management applications interface through an attribute/attribute-value interface,
wherein the virtual infrastructure is a computational representation of a physical infrastructure comprising products, devices, and subsystems, including instantiated objects corresponding to products, devices, and subsystems in the physical infrastructure, and
wherein each different device, product, and subsystem type is associated with a base object, which includes functionality common to all the different subtypes of the device, product, and subsystem type, as well as with an object type corresponding to the particular device, product, and subsystem subtype, with subtype objects inheriting the common functionality from the base type through class inheritance;
a model-mapping layer to which the virtual infrastructure interfaces through an object interface; and
the cloud-computing facility, which is connected via electronic communications to physical infrastructure corresponding to the virtual infrastructure, the cloud-computing facility providing an execution environment for the application-level components, virtual infrastructure, and model-mapping layer.

2. The physical-infrastructure control and management system of claim 1 wherein application-level components interface to virtual devices, products, and subsystems within the virtual-infrastructure layer via attributes and attribute values associated with virtual devices, products, and subsystems.

3. The physical-infrastructure control and management system of claim 2 wherein a base object and sub-type objects corresponding to a general type of product, device, or subsystem are mapped to attribute/attribute-value sets by virtual-infrastructure layer, the mappings between objects and attribute/attribute-value sets providing for information transfer both from the physical infrastructure to the virtual infrastructure and from the virtual infrastructure to the physical infrastructure.

4. The physical-infrastructure control and management system of claim 1 wherein an attribute/attribute-value set corresponding to a subtype object includes an attribute/attribute-value set for the base object as well as additional attributes unique to the subtype object.

5. The physical-infrastructure control and management system of claim 1 wherein the model-mapping layer maps instantiated-object data members and function members to data packets transmitted to products, devices, and subsystems within the physical infrastructure and maps data packets received from the physical infrastructure to instantiated-object data members and function members in the virtual infrastructure.

6. The physical-infrastructure control and management system of claim 1 wherein the visualization application provides, to a user, a view of the entire physical infrastructure and/or portions of the physical infrastructure through one or more of
a three-dimensional virtual-reality headset,
haptic glove,
three-dimensional holographic display, and
traditional two-dimensional displays.

7. The physical-infrastructure control and management system of claim 1 wherein the visualization application provide one or more of
photograph-like representations of the appearance of the physical infrastructure and/or portions of the physical infrastructure from selected vantage points,
real-time video of the physical infrastructure, and
visual representations designed to display selected types of information in ways that do not necessarily reflect the appearance of the physical infrastructure.

8. The physical-infrastructure control and management system of claim 1 wherein the visualization application provides renderings of the virtual-infrastructure to higher-level automated systems, robots, and other non-human consumers.

9. The physical-infrastructure control and management system of claim 1 wherein one or more management applications may incorporate a wide variety of different types of control logic, including one or more of:
rules and policies that are applied to the virtual infrastructure and, through the virtual infrastructure, to the physical infrastructure;
programmatically implemented control logic; and
artificial-intelligence and machine-learning logic implementations.

10. The physical-infrastructure control and management system of claim 1 wherein the virtual infrastructure may include many types of virtual devices and subsystems that have no physical-infrastructure counterparts.

11. The physical-infrastructure control and management system of claim 1 wherein the virtual infrastructure may include virtual personnel, robots, and other active entities in addition to virtual analogues of physical devices and subsystems.

12. A physical-infrastructure control and management system comprising:
application-level components, including one or more management applications, a management-interface application, and a visualization application, one or more management applications applying management operations directly to a virtual infrastructure, wherein the management operations applied to the virtual infrastructure result in propagation of control signals and information to the products, devices, and subsystems within the physical infrastructure, the control signals and information propagated from the virtual infrastructure to the products, devices, and subsystems within the physical infrastructure by network communications that use an additional infrastructure-management protocol layer and corresponding packet format that includes a device-identifier field and a device-type field, the device-type field in the packet format including a first subfield that identifies a device type and a second subfield that identifies a particular object type of a device, product, or subsystem to which the packet is addressed or from which the packet is received;

the virtual infrastructure, to which the management applications interface through an attribute/attribute-value interface, wherein the virtual infrastructure is a computational representation of a physical infrastructure comprising products, devices, and subsystems, including instantiated objects corresponding to products, devices, and subsystems in the physical infrastructure;

a model-mapping layer to which the virtual infrastructure interfaces through an object interface; and the cloud-computing facility, which is connected via electronic communications to physical infrastructure corresponding to the virtual infrastructure, the cloud-computing facility providing an execution environment for the application-level components, virtual infrastructure, and model-mapping layer.

13. The physical-infrastructure control and management system of claim 12 wherein the contents of the device-type field indicate a general device type and an object type corresponding to a particular subtype of the device, product, or subsystem identified by the identifier contained in the device-identifier field.

14. The physical-infrastructure control and management system of claim 13 wherein a subtype may correspond, at any point in time, to a large collection of subtype instances within the virtual infrastructure.

\* \* \* \* \*